United States Patent [19]

Ryan

[11] 4,083,501
[45] Apr. 11, 1978

[54] MATERIAL DISINTEGRATING APPARATUS

[75] Inventor: Kelly P. Ryan, Blair, Nebr.

[73] Assignee: Blair Manufacturing Company, Blair, Nebr.

[21] Appl. No.: 761,724

[22] Filed: Jan. 24, 1977

[51] Int. Cl.² .................... B02C 13/20; B02C 13/286
[52] U.S. Cl. ........................... 241/101 A; 241/101.7; 241/154; 241/229
[58] Field of Search ............... 241/101 A, 101.7, 154, 241/186 R, 223, 229, 235, 277

[56] References Cited

U.S. PATENT DOCUMENTS

| 3,863,850 | 2/1975 | Freeman | 241/186 R |
| 3,897,018 | 7/1975 | Wilkes et al. | 241/223 |
| 3,915,392 | 10/1975 | Kugler | 241/101 A X |
| 3,926,378 | 12/1975 | Ryan | 241/101.7 X |
| 3,972,484 | 8/1976 | Ryan | 241/154 |
| 3,979,074 | 9/1976 | White et al. | 241/101.7 |

Primary Examiner—Roy Lake
Assistant Examiner—Howard N. Goldberg
Attorney, Agent, or Firm—Wegner, Stellman, McCord, Wiles & Wood

[57] ABSTRACT

The present invention provides an apparatus for disintegrating large bales of material. The apparatus includes a plurality of disintegrating rolls in combination with means for advancing a bale into the rolls. The rolls are arranged in a vertically extending array inclined toward the advancing bale. Behind and above the rolls is an expansion chamber of substantial size into which the material is moved by the disintegrating rolls and from which the material is fed at a substantially constant rate into a cutting chamber and finally to a discharge.

4 Claims, 2 Drawing Figures

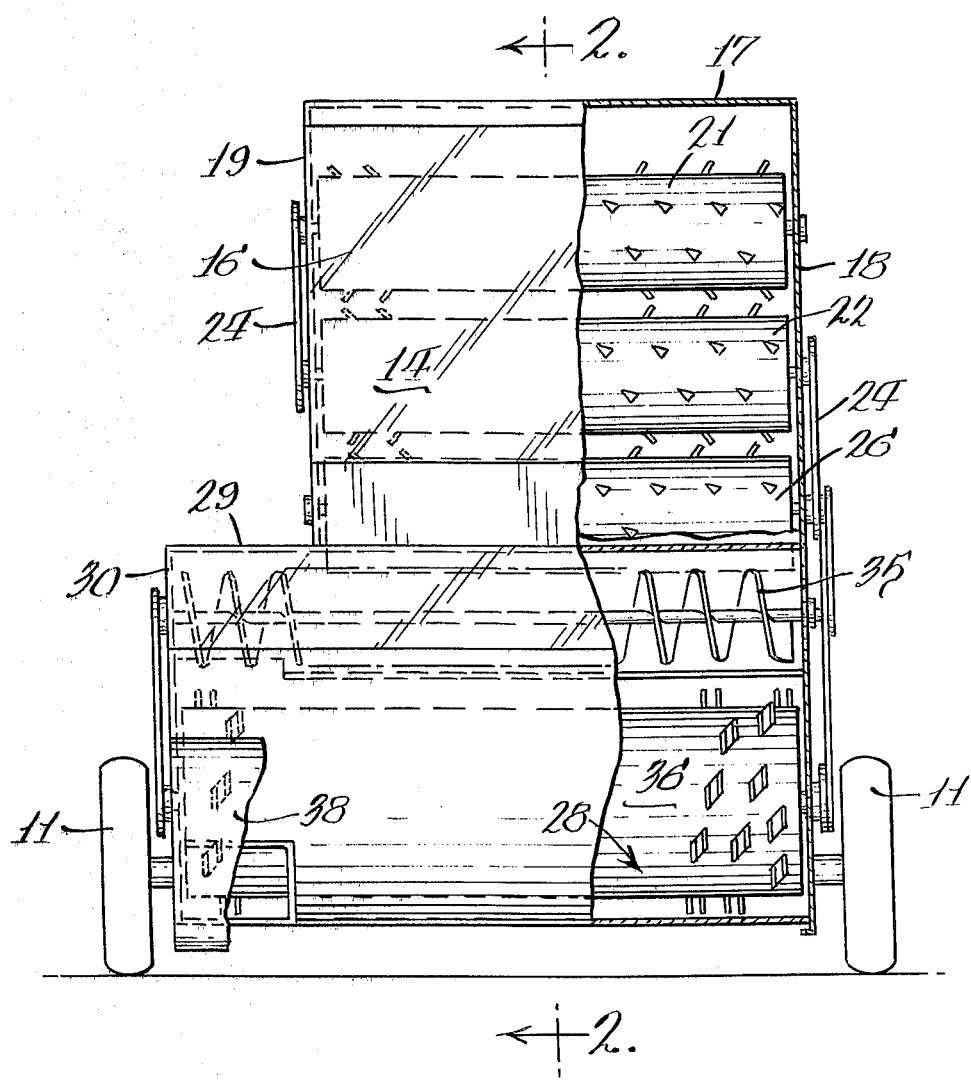

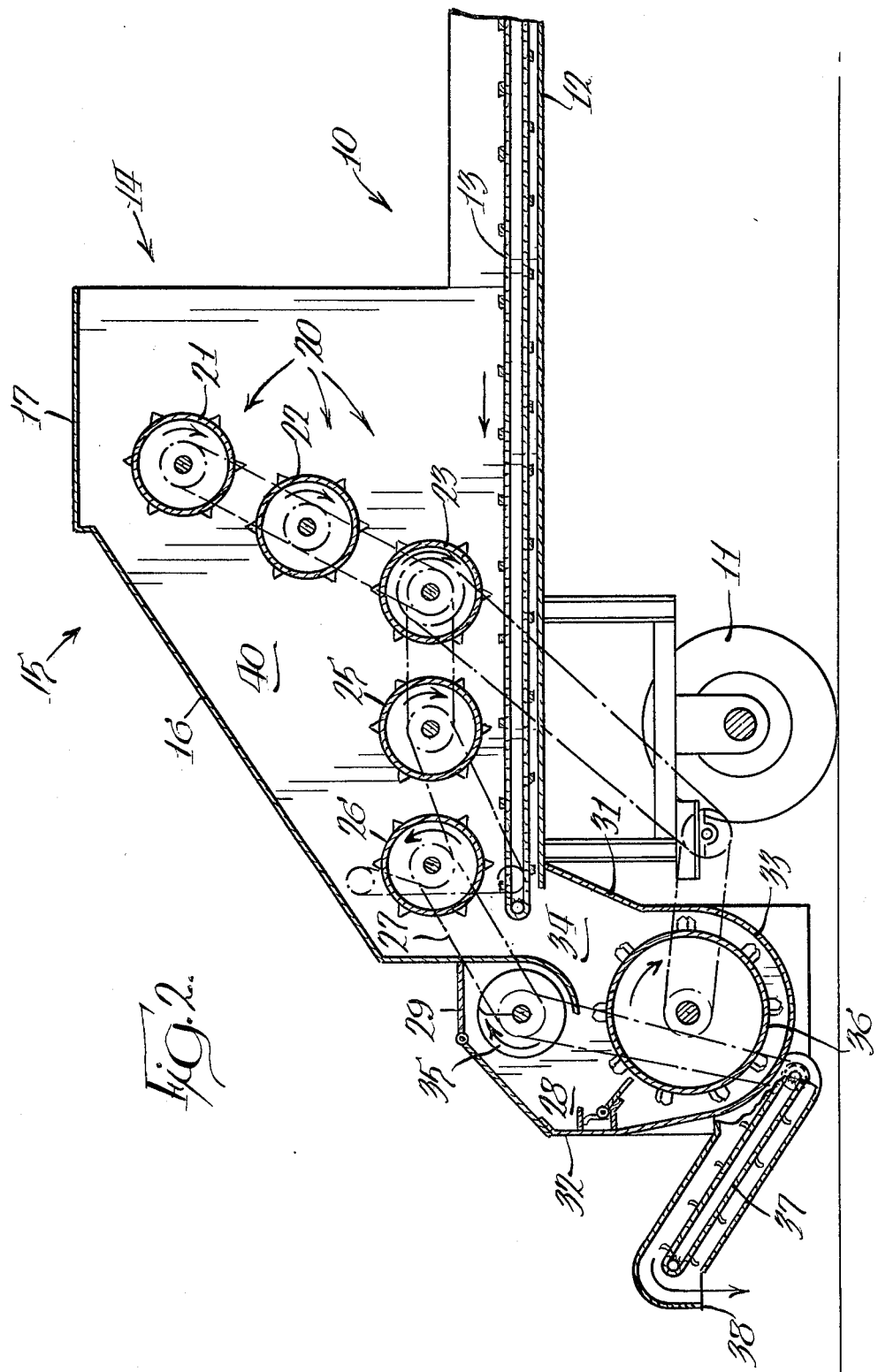

MATERIAL DISINTEGRATING APPARATUS

BACKGROUND OF THE INVENTION

Hay for forage has traditionally been stored either in the form of haystacks or has been baled and stored as baled hay. With the advent of modern farm machinery, large mobile haystack forming apparatus has been used to collect cut hay, build it into a haystack, and deposit it where desired. Apparatus for disintegrating such haystacks is shown and described in my U.S. Pat. No. 3,972,484.

Modern hay balers pick up cut hay and form it into a bale which is very much larger than the hay bales known heretofore and, in fact, several modern hay balers are capable of rolling a large quantity of hay into a roll-type bale which may weigh as much as 1500 lbs. The apparatus of the present invention is particularly designed to handle bales of such large size, and to disintegrate and cut the hay into short lengths suitable for fodder.

SUMMARY OF THE INVENTION

While the apparatus of the present invention can be used to disintegrate many forms of baled material, it is particularly useful and is shown for purposes of illustration as employed to disintegrate bales of hay to provide cattle feed.

It is uneconomical to permit cattle to feed from a large bale of hay. Cattle have a tendency to eat at a level well above the ground, and hay below that level is trampled into the ground and lost. Furthermore, it has been found to be far better to provide cattle fodder in the form of relatively short lengths of hay for better assimilation and nutrition. Thus, it is far preferable that hay which has been stored in a bale be cut into a short lengths and deposited in relatively small piles, most of which is then consumed by the cattle. The problem arises at least in part from the fact that baled hay today is often in very large rolled bales, and to feed such a bale into a disintegrating or cutting apparatus is rendered most difficult by reason of the fact that hay does not enter the rolls uniformly, has a tendency to choke up the outlet from the disintegrating device, and has a further tendency to move erratically into the final cutting operation, with the result that a regulated feed of material to create a pile of desired dimension is most difficult to achieve.

The foregoing problems are solved by the present apparatus, wherein a large bale of hay is advanced into an array of disintegrating rolls, with the array being inclined toward the advancing bale so that the bale is disintegrated and moved by the rolls to a position on the opposite side of the rolls. To ensure a uniform feed, the housing which encloses the rolls is constructed and arranged to provide an expansion chamber of substantial size on the side of the roll opposite that presented to the advancing bale. Therefore, even though the bale may tend to be fed in large masses by the disintegrating rolls into the space behind the rolls, the presence there of the chamber into which the hay can expand, permits of a uniform feed of the hay therefrom into a cutting chamber wherein it is cut into the desired lengths and discharged through an exit at a uniform rate.

BRIEF DESCRIPTION OF THE DRAWINGS

FIG. 1 is an end view partially broken away for clarity, of an appratus embodying the invention; and FIG. 2 is a vertical section along line 2—2 of FIG. 1.

DESCRIPTION OF THE PREFERRED EMBODIMENT

Referring now to the drawings, the apparatus of the present invention is shown as incorporated in a vehicle 10 adapted to be moved over the ground on wheels 11 by a suitable tractor device. The vehicle is provided with a horizontal bed 12 over which a flighted conveyor 13 passes for conveying a bale of hay introduced onto the bed at the right-hand end thereof to the left (as shown in FIG. 2), and into the disintegrating apparatus to be described. The left-hand end of the vehicle 10 (as shown in FIG. 2) is provided with a housing 14 having a top wall 15 including a slanting portion 16 and a horizontal portion 17. Side walls 18 and 19 (see FIG. 1) depend from the top wall to the sides of the bed to provide an enclosure.

Rotatably mounted within the housing on horizontal parallel axes is an array of disintegrating rolls 20. The array includes rolls 21, 22, and 23, and the array is inclined upwardly and toward the bale of hay being advanced into the housing by the conveyor 13. Means indicated at 24 are provided for rotating the rolls 21, 22, and 23 in the same direction to move hay encountered by the rolls into the space in the housing behind the rolls and also downwardly toward the lowermost roll 23. An additional disintegrator roll 25 also extends from side to side of the housing, like the rolls 21-23, and is positioned rearwardly and horizontally spaced from the roll 23 and rotated in the same direction.

Positioned rearwardly of the roll 25 is a feed roll 26 rotatably mounted in the housing 14 but rotatable in a direction opposite to the direction of rotation of the rolls 23 and 25. Means generally indicated at 27 are provided for rotating the feed roll 26 in the direction described.

Rearwardly of the housing 14 is a cutting chamber 28 which is provided with a top wall 29 wider than the housing 14, and a side wall 30 extending parallel to the side wall 18. The cutting chamber 28 is provided with front and rear end walls 31 and 32, and a curved bottom wall 33.

Immediately rearwardly of the feed roll 26 is a space or chute 34 which directs hay fed by the roll 26 into the cutting chamber 28. Positioned in the upper portion of the cutting chamber is an auger 35 and rotatably mounted within the cutting chamber is a cutting wheel 36 of the same general type as described in my U.S. Pat. No. 3,972,484. A conveyor 37 conveys cut hay from the cutter wheel 36 to a discharge opening 38.

Positioned rearwardly of the array of disintegrating rolls is an expansion chamber 40 which, as will be noted from FIG. 2, is inclined upwardly from left to right, i.e., in the same general direction of inclination as the array 20 of disintegrating rolls.

In the embodiment chosen for illustration, the disintegrating rolls are approximately 6 feet in length, and the expansion chamber has a volume of approximately 200 cubic feet. To handle large bales, an expansion chamber having a volume of at least 100 cubic feet is required, and a chamber of double that size, as illustrated, ensures proper operation and uniformity of feed.

In operation, a large bale of hay is placed on the conveyor 13 at the right-hand end thereof as shown in FIG. 2, and the bale is advanced by the conveyor into the array of rotating disintegrator rolls 20. The disintegrator rolls break up the bale and the continuing movement of the bale causes the hay to move either rearwardly of the array of rolls into the chamber 40, or downwardly to pass beneath the disintegrating rolls 23 and 25. Hay passing beneath the latter two rolls may also be moved by the rolls into the chamber 40. Because the chamber 40 is of substantial size and has a volume of at least 100 cubic feet, the hay disintegrated from the rolls passes thereinto and may expand to a uniform natural density. By virtue of the expansion chamber, the feed roll 26 is able to feed disintegrated hay at a uniform rate through the chute 34 into the cutting chamber 28, where it is subject to the action of the cutting roll 36 to cut the hay into short legnths and deliver it to the conveyor 37. In the event hay tends to build up in the cutting chamber 28, the auger 35 serves to distribute the hay uniformly from end to end of the cutter roll, thereby to enhance the uniformity of feed and to ensure the proper cutting of all hay fed into the chamber 28.

By virtue of the foregoing, it is possible to disintegrate very large bales of hay and feed the disintegrated hay into a cutting device at a uniform rate for cutting into suitable lengths for cattle feed.

I claim:

1. Apparatus for reducing a large bale of material to short lengths comprising an elongated bed, a housing at one end of the bed, said housing have a top wall and depending side walls enclosing the rear portion of the bed, conveyor means for receiving a bale and advancing the bale along the bed and into the housing, a plurality of disintegrating rolls in the housing and extending from side to side thereof said rolls being mounted for rotation about parallel horizontal axes with at least three disintegrating rolls being arranged in an array inclining upwardly toward a bale advancing in the conveyor, a fourth disintegrating roll in the housing and extending from side to side thereof, said fourth disintegrating roll being mounted for rotation about a horizontal axis parallel to the axes of the other disintegrating rolls and being horizontally spaced from the lowermost disintegrating roll of said array in a direction away from an advancing bale, means for rotating all of said rolls in a common direction, a feed roll in the housing and extending from side to side thereof, said feed roll being mounted for rotation about a horizontal axis parallel to the axes of the disintegrating rolls and being horizontally spaced from the lowermost disintegrating roll in a direction away from an advancing bale, means for rotating the feed roll in a direction opposite to the direction of rotation of the disintegrating rolls, with said lowermost disintegrating roll said fourth disintegrating roll and said feed roll forming a horizontally arranged array of rolls, said conveyor means having an end portion within the housing and extending entirely underneath said horizontally arranged array of rolls, said housing being constructed and arranged to provide an expansion chamber of substantial volume above all of the rolls, means forming a downwardly extending chute rearwardly of the feed roll, a cutting chamber communicating with the chute, and means in the cutting chamber for cutting material fed thereto by the feed roll and delivering the cut material to a discharge.

2. Apparatus for reducing a bale of material to short lengths comprising an elongated bed, a housing at one end of the bed, said housing having a top wall and depending side walls enclosing the rear portion of the bed, conveyor means for receiving a bale and advancing the bale along the bed and into the housing, a plurality of disintegrating rolls in the housing and extending from side to side thereof said rolls being mounted for rotation about parallel horizontal axes with at least three disintegrating rolls being arranged in an array inclining upwardly toward a bale advancing in the conveyor, means for rotating all of said rolls in a common direction, a feed roll in the housing and extending from side to side thereof, said feed roll being mounted for rotation about a horizontal axis parallel to the axes of the disintegrating rolls and being horizontally spaced from the lowermost disintegrating roll in a direction away from an advancing bale, means for rotating the feed roll in a direction opposite to the direction of rotation of the disintegrating rolls, said conveyor means having an end portion within the housing and extending horizontally entirely under all of said rolls, said housing being constructed and arranged to provide an expansion chamber of substantial volume inclining upwardly in the same direction as the inclination of the array of rolls, means forming a downwardly extending chute rearwardly of the feed roll, a cutting chamber communicating with the chute, and means in the cutting chamber for cutting material fed thereto by the feed roll and delivering the cut material to a discharge.

3. Apparatus for reducing a large bale of hay to short length cattle feed comprising an elongated bed, a housing at one end of the bed, said housing having a top wall and depending side walls enclosing the rear portion of the bed, conveyor means for receiving a bale of hay and advancing the bale along the bed and into the housing, a plurality of disintegrating rolls in the housing and extending from side to side thereof said rolls being mounted for rotation about parallel horizontal axes with at least three disintegrating rolls being arranged in an array inclining upwardly toward a bale advancing in the conveyor, means for rotating all of said rolls in a common direction, a feed roll in the housing and extending from side to side thereof, said feed roll being mounted for rotation about a horizontal axis parallel to the axes of the disintegrating rolls and being horizontally spaced from the lowermost disintegrating roll in a direction away from an advancing bale, means for rotating the feed roll in a direction opposite to the direction of rotation of the disintegrating rolls, said conveyor means having an end portion within the housing and extending entirely under the lowermost disintegrating roll and the feed roll, said housing being constructed and arranged to provide an expansion chamber inclining upwardly in the same direction as the inclination of the array of rolls and having a volume of at least 100 cubic feet above all of the rolls, means forming a downwardly extending chute rearwardly of the feed roll, a cutting chamber communicating with the chute, and means in the cutting chamber for cutting hay fed thereto by the feed roll and delivering the cut hay to a discharge.

4. Apparatus for reducing a large bale of hay to short length cattle feed comprising an elongated bed, a housing at one end of the bed, said housing having a top wall and depending side walls enclosing the rear portion of the bed, conveyor means for receiving a bale of hay and advancing the bale along the bed and into the housing, a plurality of disintegrating rolls in the housing and extending from side to side thereof said rolls being mounted for rotation about parallel horizontal axes with at least three disintegrating rolls being arranged in an array inclining upwardly toward a bale advancing in the conveyor, means for rotating all of said rolls in a common direction, a fourth disintegrating roll in the housing and extending from side to side thereof, said fourth disintegrating roll being mounted for rotation about a horizontal axis parallel to the axes of the disintegrating rolls and being horizontally spaced from the lowermost disintegrating roll in a direction away from an advancing bale, a feed roll in the housing and extending from side to side thereof, said feed roll being mounted for rotation about a horizontal axis parallel to the axes of the disintegrating rolls and being horizontally spaced from the fourth disintegrating roll in a direction away from an advancing bale, means for rotating the feed roll in a direction opposite to the direction of rotation of the disintegrating rolls, said lowermost disintegrating roll said fourth disintegrating roll and said feed roll forming a horizontally arranged array of rolls with said conveyor means having an end portion within the housing and extending entirely underneath said horizontally arranged array of rolls, said housing being constructed and arranged to provide an expansion chamber inclining upwardly in the same direction as the inclination of the array of rolls and having a volume of at least 200 cubic feet above all of the rolls, means forming a downwardly extending chute rearwardly of the feed roll, a cutting chamber communicating with the chute, and means in the cutting chamber for cutting hay fed thereto by the feed roll and delivering the cut hay to a discharge.

* * * * *